United States Patent [19]
Disparte et al.

[11] 3,979,725
[45] Sept. 7, 1976

[54] MULTI-WAY PROGRAM BRANCHING CIRCUITS

[75] Inventors: Charles P. Disparte, Warren L. Hall, Jr., both of Palos Verdes Peninsula; Kenneth N. Isaac, Tustin; C. Howard Mock, Palos Verdes Peninsula, all of Calif.

[73] Assignee: Xerox Corporation, Rochester, N.Y.

[22] Filed: Aug. 6, 1973

[21] Appl. No.: 385,949

[52] U.S. Cl. ............................................. 340/172.5
[51] Int. Cl.² ............................................ G06F 9/00
[58] Field of Search ................................. 340/172.5

[56] References Cited
UNITED STATES PATENTS

| | | | |
|---|---|---|---|
| 3,562,713 | 2/1971 | Packard | 340/172.5 |
| 3,570,006 | 3/1971 | Hoff et al. | 340/172.5 |
| 3,623,157 | 11/1971 | Slapteford | 340/172.5 |
| 3,634,883 | 1/1972 | Kreidermacher | 340/172.5 |
| 3,665,510 | 5/1972 | Brandt et al. | 340/172.5 |
| 3,693,162 | 9/1972 | Spangler | 340/172.5 |
| 3,699,526 | 10/1972 | Iskiyan et al. | 340/172.5 |
| 3,713,108 | 1/1973 | Edstrom et al. | 340/172.5 |
| 3,753,236 | 8/1973 | Flynn et al. | 340/172.5 |

*Primary Examiner*—Raulfe B. Zache
*Attorney, Agent, or Firm*—James J. Ralabate; Michael J. Colitz; Franklyn C. Weiss

[57] ABSTRACT

Disclosed are methods and apparatus for multi-way program branching in a digital computer based on the contents of a data register. This is accomplished by loading any data field of interest into a data register and using the output lines as address lines to a plurality of read-only memory devices. Each device contains a set of random memory addresses. Logic circuits under program control select and enable one device, thereby producing one address. Finally, circuits under program control force a program branch to the location address produced. Thus, by programming the read-only memory devices and the computer appropriately, a plurality of sets of data fields are associated with and result in branches to a plurality of sets of locations, thereby giving the programmer the general capability of branching to any one of the plurality of locations within one instruction execution cycle based on the interrogation of any one data word.

13 Claims, 5 Drawing Figures

ST (STRAIGHT IN)

BS (BYTE SWAP)

NS (NIBBLE SWAP)

BN (BYTE NIBBLE SWAP)

MULTI-WAY PROGRAM BRANCHING CIRCUITS

BACKGROUND OF THE INVENTION

This invention relates to data processing equipment and more particularly to circuits for allowing a multi-way program branch to any one of a preselected plurality of random memory locations in one instruction execution cycle, said selection based upon the contents of a data register. Appropriate use of this multi-way branching capability on any set of variables selected by the programmer minimizes the amount of memory and time required to implement and run computer programs.

In a typical machine language program, a conditional branch is implemented through the use of a conditional branch instruction followed by a location address. The conditional branch instruction will look at some hardware state, an overflow indicator for instance, and on the basis of that indicator either branch to the specified location or skip the next line of the program and continue on. This would be an example of a two-way branch in that the program either branches to the specified location or continues on with the program, the decision being based on a data bit.

Three-way branches are commonly seen in machine language programs as comparison instructions. A word in memory is typically used as a reference against which the contents of the accumulator are compared. Two addresses typically follow the instruction, the first address being the one that the program will branch to in case the reference is larger, and the second being the address the program will branch to in case the reference is smaller. If the two values are equal the program will continue on.

The problem with these two kinds of branch instructions is that they interrogate the data bit by bit. In the case where the data field is long and complex, it can be seen that these techniques would involve a multiplicity of shifting and testing instructions which would slow down the program and use a substantial amount of memory.

In some applications where high speed is necessary, and where memory capacity is ample, a table look-up method is used where the data itself becomes the least significant bits of the address field. Using an example of an eight bit data field in a system where a memory location has a 16 bit address, one may mask together the most significant eight bits of the address field and use the eight bits of data as the least significant eight bits of the address field. A branch to this address would immediately provide each separate data bit configuration with a distinct location to branch to. Each of these 256 locations could, in turn, contain an unconditional branch instruction to any location in memory. Thus, each combination of bits would force the program to a different and independent memory location. The problem with this system, of course, is that 256 words of memory must be used every time this branch technique is used.

A hardware variation of the table look-up method is employed in microprogrammable computers to branch to that part of the microprogram in the control memory required to implement the operation code being executed. For a numerical example, assume that the operation code is contained in the machine language program as an eight bit field and that all the programs needed to implement the entire operation code vocabulary are located in the first thousand words of microcode. In this case, an eight by ten bit matrix could be used to convert the eight bit operation code directly into a ten bit address. Appropriate hardware to allow for a direct branch to the address thus produced would have the desired result of branching directly to one of a plurality of preselected memory locations based on the contents of the operation code field. However, even where this specialized multi-way branching capability is provided for the processing of operation codes, in the remainder of the program, wherein numerous branches must be made on complex fields of data, the programmer is forced to rely on the process of shifting and testing bit by bit or on the table look-up method.

SUMMARY OF THE INVENTION

The capability of implementing multi-way branches anywhere in the program based on any data is provided by including in the central processing unit a plurality of addressable memory devices. The data field is used to drive the address lines of these devices, the program enables one of the plurality of devices, and the output of the enabled device is used directly as the address to be branched to. In order to keep down the number and size of addressable devices, assumptions were made. First, the number of data bits may be limited to eight since a microcoded data field usually does not exceed eight bits in length and, in the preferred embodiment, swapping means are provided for efficiently placing the eight bits of interest into the least significant half of the sixteen bit data word. Second, the number of address bits output from the devices need only be four bits since the microprogrammer is typically branching to one of several different locations in the same area of memory. The microprogram itself supplies five more significant bits and two less significant bits to the address output of the devices with the result that any location within a 64 word window within a two thousand word memory may be directly addressed by any eight bits of data in any one sixteen-way branch.

A further minimization of hardware required to implement this capability is effected by using the same device for several applications in the microprogram. That is, the same device may be used in various parts of the program by supplying different most and least significant bits from each individual subroutine while using the same four bit output from the addressable device. Thus, in the preferred embodiment, 16 addressable devices were sufficient for 2000 words of microcode.

Providing the microprogrammer with a capability of up to sixteen-way branches on any eight bits of data results in numerous advantages. The speed of the system is increased since a multi-way branch is much faster in execution time than the corresponding shifting and testing operations required in typical systems. Memory requirements are reduced since there is less need for table look-up techniques and conventional conditional branch techniques both of which use a substantial amount of memory. Finally, programs are easier to write if the programmer is allowed to specify a sixteen-way branch directly and therefore the time required to write and check out a program is minimized.

It is therefore the object of this invention to provide apparatus for use in a digital computer for converting data words into sets of main memory location addresses and for branching to the locations thus produced.

DETAILED DESCRIPTION OF THE INVENTION

Figure 1:
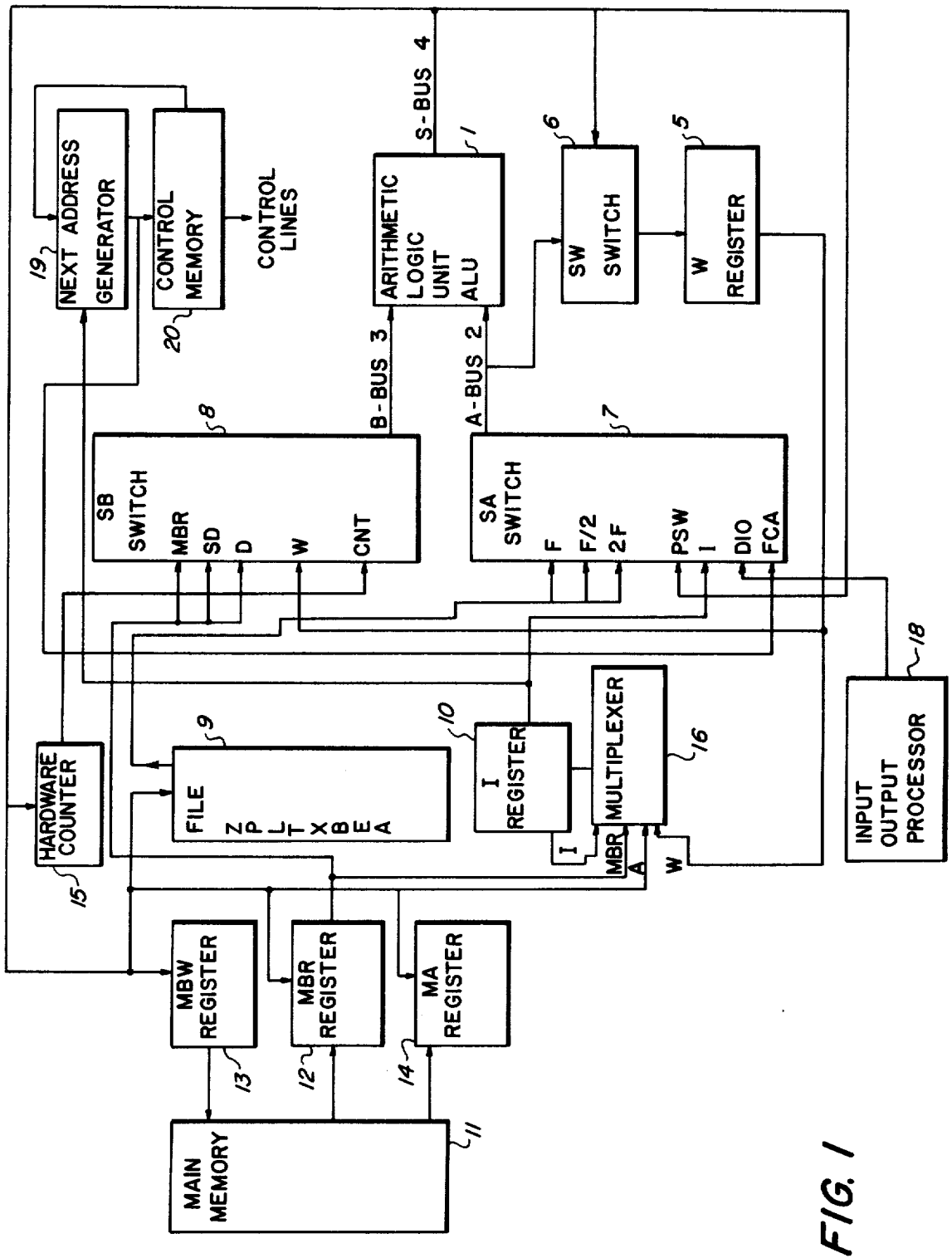
FIG. 1 is a block diagram of the central processing unit circuits.

The hardware necessary to implement this Multi-Way Branching capability is shown in block diagram form in FIG. 1, and may be described generally as a CPU with a microprogrammed Control Memory 20. Instruction machine codes are hardware translated into Control Memory addresses and are used to call on the various microprograms contained in the Control Memory.

The CPU in FIG. 1 is built around a 16 bit Arithmetic Logic Unit (ALU) 1 which performs all the required arithmetic or logic functions. The two input buses are the A Bus 2 and the B Bus 3 and the output is distributed throughout the CPU on the S Bus 4. Left and right shifts of data are normally by the 2F or F/2 inputs to the SA Switch 7. The SW Switch 6 controls the loading or unloading of the W Register 5 from the S Bus 4 or the SA Switch 7.

The SA Switch 7 is a multiplexer that determines what function is to be placed on the 16 bit A bus. The relevant input functions are defined as follows: F is the output of the File 9. F/2 is the File output shifted one place to the right. This is used in conjunction with the hardware multiply. 2F is the output of the File shifted one place to the left. This is used in conjunction with the hardware divide. PSW is the program status word which contains the overflow and carry indicators. I is the output of the I Register 10. The DIO input is received on a set of data lines from an Input Output Processor 18. The FCA input is the address of the current microcontrol word plus one. This is generally used for "branch and save" microsubroutine calls and stored as a return address in the File 9 or I Register 10.

The SB Switch 8 is another multiplexer which determines what function is to be placed on the 16 bit B Bus 3 which is the other input to the ALU 1. MBR is the data input from Main Memory 11. SD is the lower byte of the MBR data with the sign of the byte (bit 8) spread through the upper byte. This is used for effective operand address calculation. D is the lower byte of the MBR data with 0's in the upper byte. This is also used for effective operand address calculations. W is data from the W Register 5. CNT is the output of a 8 bit Hardware Counter 15 contained within the CPU.

The File 9 may be implemented from bipolar random access memory chips and has a capacity of thirty-two sixteen bit words. The first eight words have specific functions as follows: Z is a zero source. P is the address of the current instruction in the Main Memory program. L is the link address. T is for temporary storage. X is index register number one, used for post-indexing. B is index register number two, used for pre-indexing. E is the extension of the Accumulator and A is the Accumulator. The remaining twenty-four locations may be used by the microprogrammer as working file locations and are referred to as File eight through thirty-one. The MBW Register 13 holds data that will be written into Main Memory. The MBR Register 12 holds data that has been read from Main Memory. The MA Register 14 holds the address of that location in Main Memory that is currently accessed.

The Control Memory 20, implemented from read-only-memory chips, contains the entire microprogram. The Next Address Generator 19 receives address information from the Control Memory and determines that next Control Memory address to be accessed either directly from the Control Memory inputs or by forcing a branch to an address determined by the data from the I Register 10.

Figure 2:
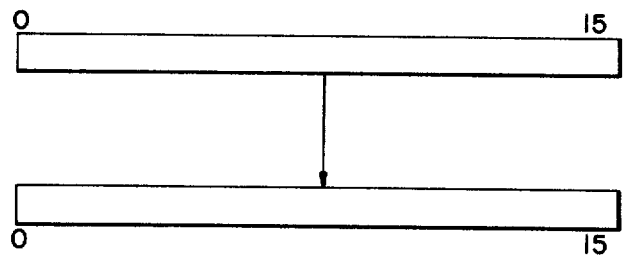
FIG. 2 shows the four swapping options available when loading the I Register.
Figure 2:
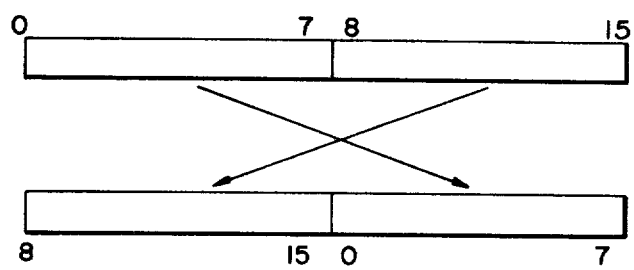
Figure 2:
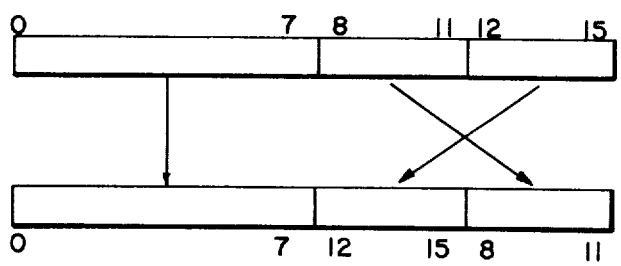
Figure 2:
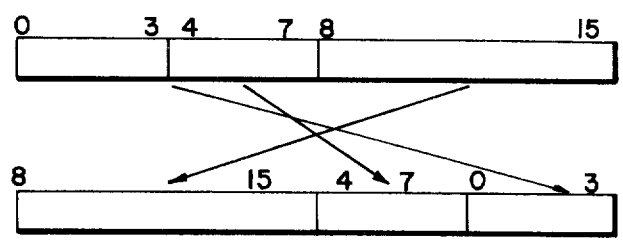

The I Register 10 may be loaded through the I Multiplexer 16 from one of four sources, the I Register, the MBR Register, the S Bus (labelled A), or the W Register. Data may be loaded into the I Register in any one of four ways, as shown in FIG. 2, resulting in a hardware configuration that can manipulate byte and hexadecimal data within a minimum amount of execution time. For instance, a byte swap could have been accomplished by a circular shift of eight bits to the right, and interchanges of hexadecimal (hex) information could have been accomplished by a series of shifting and masking sequences. In this embodiment, however, hex and byte swaps are accomplished directly with a corresponding savings in computer time and programming effort.

Figure 3:
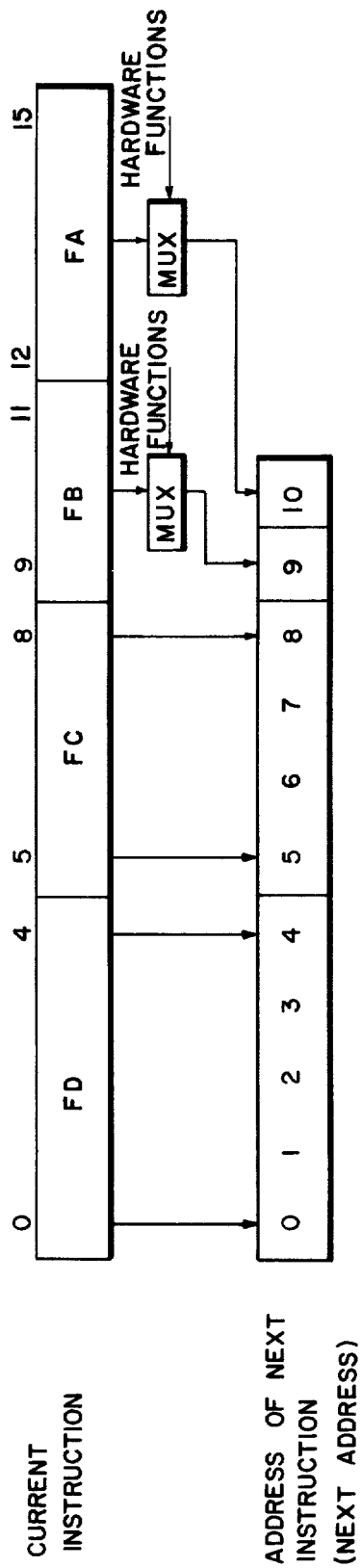
FIG. 3 shows the formats of the addressing portions of the Current Instruction and the Address of Next Instruction.

FIG. 3 shows the four sub-fields (FA, FB, FC and FD) that make up the sixteen bit address field of the Current Instruction which in turn is part of the sixty bit microcoded instruction format used in the preferred embodiment. This figure also shows how the Address of the Next Instruction to be executed is normally assembled. The FA field in FIG. 3 is a four bit field which is used to determine the source of the least significant bit of the Address of the Next Instruction. With these four bits, the programmer may choose from a list of hardware functions which includes zero, one, the sign bit of the S bus, the carry indicator, and other hardware functions. Since the FA field determines the least significant bit of the Address of the Next Instruction, it may be said that the FA field determines whether the Address will be odd or even. The FB field is a further three bit field for determining the second least significant bit of the Address of the Next Instruction. The functions selectable by this three bit field are zero, one, the overflow indicator, and other hardware functions. Bits five through eight of the Next Address are either the output of the multi-way branch apparatus, not shown, or the contents of the FC field, depending on a branch code located in another part of the Current Instruction. If direct addressing is used, the four bits of the FC field are used as the four bits in the Next Address. A detailed discussion of the multi-way branch method of producing these four bits is included below. Finally, the most significant five bits of the Next Address are provided by the FD field, resulting in an 11 bit address capable of defining the address of any location in a two thousand word memory.

Figure 4:
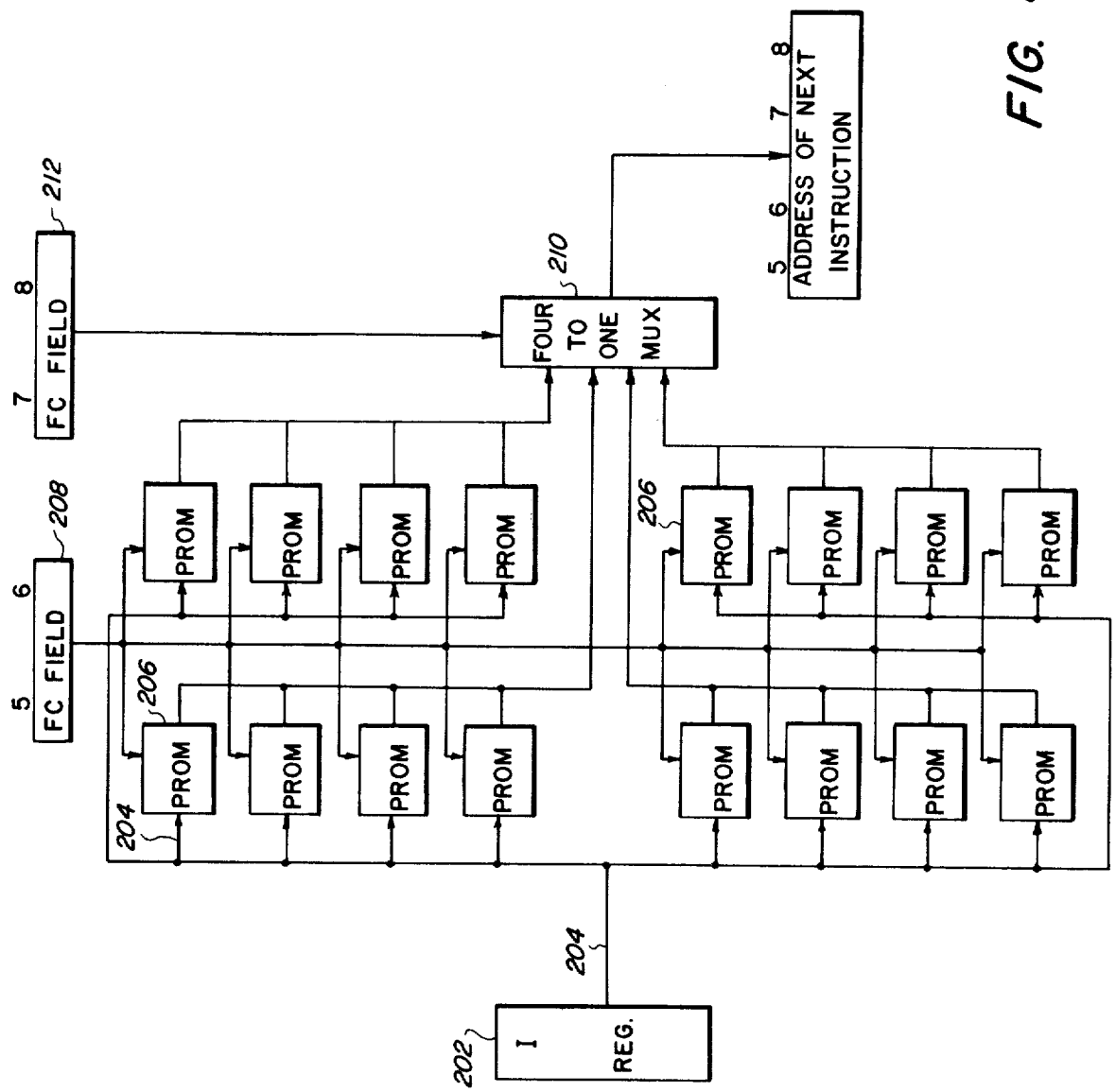
FIG. 4 is a simplified schematic diagram of the Multi-Way Branching apparatus.

FIG. 4 is a simplified schematic diagram of the multi-way branching apparatus. The I Register 202 is a 16 bit register which may be loaded from several sources and incorporates a byte and hexadecimal swapping capability. The eight least significant bits of I Register data are coupled through lines 204 to 16 Programmable Read- Only Memory devices 206. Each Read-Only Memory device has a capacity of two hundred fifty-six by four bits and therefore requires eight address lines which are driven by the eight output lines 204 from the I Register.

The 16 Read-Only Memory devices 206 are separated into four groups of four devices each. Two lines from the FC field 208, bits five and six, are connected to each group of four Read-Only Memory devices and are coded such that one device from each group of four is enabled. At this point it can be seen that four words of four bits each are applied to the Four-to-One Multiplexer 210. Two more lines from the FC field 212, bits seven and eight, are applied to the Four-to-One Multiplexer 210 to select one of the four words which, finally, is used as bits five through eight of the Address of the Next Instruction.

In operation, this system is implemented as follows. First the microprogrammer writes a separate subroutine for each pattern of data that he will expect to process. An example of this application is shown on FIG. 5, which will be discussed below, where twelve separate subroutines are written for various indexing modes. Second, the microprogrammer programs a Read-Only Memory chip so that all elements of that set of data contained in the I Register will result in the creation of that set of addresses that will result in branches to the appropriate parts of the microprogram. Finally, the microprogrammer supplies in the Current Instruction microcode the appropriate bits in the FA, FB and FD fields to supply the required bits in the Next Address and codes the FC field to select the Read-Only Memory chip he just programmed. For instance, again in FIG. 5, if the data in the I Register is 0000, the Read-Only Memory chip, in conjunction with the address field of the Current Instruction, will produce the Next Address "FROX6". Thus, execution of the Current Instruction while the appropriate data is contained in the I Register will result in a forced branch to the appropriate address.

Figure 5:
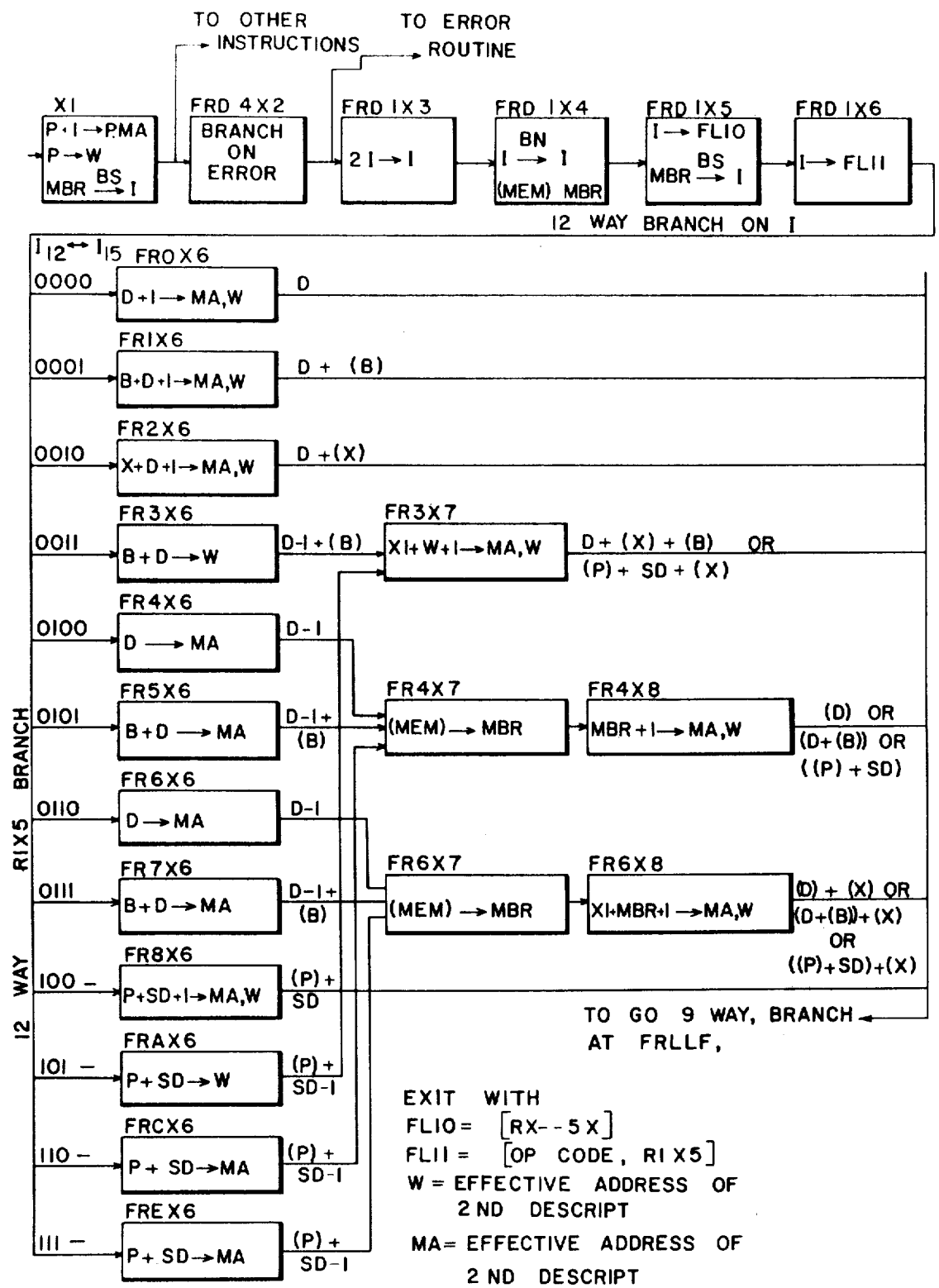
FIG. 5 is a flow chart of a microprogram using a Multi-Way branch.

FIG. 5 constitutes a detailed flow chart of a subroutine using the multi-way branching option. Each box represents one word in the program. Above each box is the symbolic location of that instruction and within each box is a symbolic representation of the data flow accomplished when the instruction is executed.

In FIG. 5, location X1 is the basic starting point in the processing of all instructions. At this point the MBR Register contains the first half of an instruction which will be byte swapped into the I Register. Also, the program counter will be incremented by 1 and stored into the MA Register for use later in accessing the second half of the instruction word and also saved in the W Register for use later. At this point, a branch will be taken on the contents of the I Register. If bits 0 through 7 are a hex 10 in this particular example, the program will branch to location FRD4X2. For other instructions codes the program will branch elsewhere. At location FRD4X2, the I Register data is tested for the presence of the Variable Field Addressing option in this example, and if it is not implemented the program branched to an error routine. The next three instructions shift the I Register data and stores the result in file location 10 for later use. Finally, the contents of the MBR Register is byte swapped into the I Register and is also stored away in file location 11. A 12 way branch is now taken on the contents of $I_{12}$ through $I_{15}$ which corresponds to all the indexing options available to the programmer.

It is to be understood that the above described arrangement is merely illustrative of the principals of the invention. For example, this invention could be used in a computer that is not microprogrammable by using the disclosed apparatus to assemble an effective main memory address instead of a control memory address. The principal of multi-way branching could be used in microprogrammed digital systems of any kind where logic decisions based on data are required. Also, this apparatus could be provided with some or all of the addressable devices programmable in real time so that the operating characteristics of the system and the operation code vocabulary could be under dynamic program control.

While particular embodiments of the present invention have been described and illustrated, it will be apparent to those skilled in the art that changes and modifications may be made therein without departure from the spirit and scope of the invention as claimed.

What is claimed is:

1. In a digital computer controlled by a program stored in main memory, apparatus for providing multi-way branching comprising:
   a plurality of addressable devices for storing random main memory location addresses,
   logic means coupled to said devices and controlled by said program for selecting and enabling one of said plurality of devices,
   a data register loaded under program control with a data field, the bits of said data field being coupled from the output lines of said data register to said plurality of devices for addressing said devices, and
   branch means under control of said program and coupled to said main memory location address output of said enabled device for forcing a program branch to the main memory location thus selected.

2. The apparatus of claim 1 wherein the number of said data field bits exceeds the number of addressable device address input lines and wherein the required subset of said data field bits is coupled from the output lines of said data register to the plurality of addressable devices and supplies all the addresing information required by said addressable devices.

3. The apparatus of claim 2 wherein said data register includes swapping means for interchanging four bit and eight bit subfields of said data field contained within said data register in one instruction cycle whereby data bits of interest are positioned within that subset of said data register bits which subset is coupled to said addressable devices.

4. In a digital computer controlled by a program stored in main memory, apparatus for providing multi-way branching comprising:
   a plurality of addressable devices for storing partial addresses of random main memory locations,
   logic means coupled to said devices and controlled by said program for selecting and enabling one of said plurality of devices,
   a data register loaded under program control with a data field, the bits of said data field being coupled from the output lines of said data register to said plurality of devices for addressing said devices.
   addressing means for supplying the remaining bits of said address of said random main memory locations, which bits, when masked together with the partial address output from said addressable devices, produce complete main memory addresses, and branch means controlled by said program and coupled to said addressing means and said addressable device output for assembling a complete main memory address and for forcing a program branch to the main memory location address thus assembled.

5. In a microprogrammable digital computer controlled by a microprogram stored in control memory, apparatus for providing multi-way branching comprising:
- a plurality of addressable devices for storing random control memory location addresses,
- logic means coupled to said devices and controlled by said microprogram for selecting and enabling one of said plurality of devices,
- a data register loaded under microprogram control with a data field, the bits of said data field being coupled from the output lines of said data register to said plurality of devices for addressing said devices, and
- branch means controlled by said microprogram and coupled to said control memory location address output of said enabled device for forcing a microprogram branch to the control memory location thus selected.

6. The apparatus of claim 5 wherein the number of said data register bits exceeds the number of addressable device address bits and wherein the required subset of said data register bits is coupled to the plurality of devices and supplies all the addressing information required by said addressable devices.

7. The apparatus of claim 6 wherein said data register includes swapping means for interchanging four bit and eight bit subfields of said data field contained within said data register in one instruction cycle whereby data bits of interest are positioned within that subset of said data register bits which is coupled to said addressable devices.

8. In a microprogrammable digital computer controlled by a microprogram stored in control memory, apparatus for providing multi-way branching comprising:
- a plurality of addressable devices for storing partial addresses of random control memory locations,
- logic means coupled to said addressable devices and controlled by said microprogram for selecting and enabling one of said plurality of addressable devices,
- a data register loaded under microprogram control with a data field, the bits of said data field being coupled from the output lines of said data register to said plurality of addressable devices for addressing said devices,
- addressing means for supplying the remaining bits of said random control memory location addresses which, when masked together with the partial address information output from said addressable devices, produces complete control memory addresses, and branch means controlled by said microprogram and coupled to said addressing means and said addressable device output for assembling a complete control memory address and for forcing a microprogram branch to the control memory location address thus assembled.

9. In a digital computer controlled by a program stored in memory, apparatus for providing multiway branching comprising:
- a plurality of addressable random access memory devices for storing random memory location addresses,
- logic means coupled to said addressable devices and controlled by said program for selecting and enabling one of said plurality of addressable devices,
- a first data register loaded under program control with a data field, the bits of said data field being coupled from the output lines of said first data register to the plurality of addressable devices for addressing said devices,
- a second data register loaded under program control with a memory location address, the bits of said memory location address being coupled from the output lines of said second data register to said plurality of addressable devices for use as input data bits,
- loading means controlled by said program and connected to said addressable devices for loading the address information output by said second data register into any one of said addressable devices, and
- branch means controlled by said program and coupled to said memory location address output of said enabled addressable device for forcing a program branch to the memory location thus selected.

10. The apparatus in claim 9 wherein said digital computer is microprogrammable, said program is a microprogram, and said memory is a control memory.

11. In a microprogrammable digital computer controlled by a microprogram stored in control memory, apparatus for providing multi-way branching comprising:
- a plurality of addressable read-only memory devices programmed for storing a plurality of partial control memory addresses,
- logic means responsive to the execution of the current microprogram instruction by said control memory and coupled to said read-only memory devices for enabling the output of one of said plurality of read-only memory devices to be produced as an output,
- a data register adapted to be loaded under microprogram control with data bits, said data bits being coupled from the output lines of said data register to the plurality of read-only memory devices through the addressing lines of said read-only memory devices,
- an address register for combining the partial control memory addresses produced by the enabled read-only memory devices with addressing information coupled from said control memory by said microprogram execution to assemble a complete control memory address, and
- branch means controlled by said microprogram and coupled to said address register for forcing a microprogram branch to the location assembled in said address register.

12. In a digital computer, a multi-way branching method comprising the steps of:
- loading a data register with a data field,
- coupling the output of said data register through address lines to a plurality of addressable devices, containing computer main memory addresses,
- selecting the output of a single device, and
- forcing a program branch to the memory address thus selected.

13. In a digital computer, a multi-way branching method comprising the steps of:
   loading a data register with a data field,
   coupling the output of said data register through address lines to a plurality of addressable devices containing partial memory addresses,
   selecting the output of a single device,
   adding to said partial memory address thus selected the remaining bits derived from the execution of a program instruction to assemble an entire memory address, and
   forcing a program branch to the location specified by said entire memory address.

* * * * *